United States Patent
Mericas et al.

(10) Patent No.: US 6,694,427 B1
(45) Date of Patent: Feb. 17, 2004

(54) METHOD SYSTEM AND APPARATUS FOR INSTRUCTION TRACING WITH OUT OF ORDER PROCESSORS

(75) Inventors: Alexander Erik Mericas, Austin, TX (US); William John Starke, Round Rock, TX (US); Joel M. Tendler, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/552,859

(22) Filed: Apr. 20, 2000

(51) Int. Cl.[7] ............................................... G06F 9/00
(52) U.S. Cl. ................................ 712/227; 712/233
(58) Field of Search ............................. 712/227, 226, 712/220, 233, 234, 205, 237, 238, 239, 244, 245, 219; 714/45, 47, 37, 38, 39, 30, 31, 46

(56) References Cited

U.S. PATENT DOCUMENTS

| | | | | |
|---|---|---|---|---|
| 5,751,985 A | * | 5/1998 | Shen et al. ................. | 712/218 |
| 5,862,371 A | * | 1/1999 | Levine et al. ............... | 712/228 |
| 5,878,208 A | * | 3/1999 | Levine et al. ............... | 714/38 |
| 5,894,575 A | * | 4/1999 | Levine et al. ............... | 717/128 |
| 5,938,760 A | * | 8/1999 | Levine et al. ............... | 712/220 |
| 5,944,841 A | * | 8/1999 | Christie ....................... | 714/38 |
| 6,092,180 A | * | 7/2000 | Anderson et al. ........... | 712/200 |
| 6,094,729 A | * | 7/2000 | Mann .......................... | 714/25 |
| 6,167,536 A | * | 12/2000 | Mann .......................... | 714/45 |
| 6,314,530 B1 | * | 11/2001 | Mann .......................... | 714/38 |

* cited by examiner

Primary Examiner—Henry W. H. Tsai
(74) Attorney, Agent, or Firm—Duke W. Yee; Mark E. McBurney; Lisa L. B. Yociss

(57) ABSTRACT

A method, system and apparatus for instruction tracing with out of order speculative processors. With the present invention, information corresponding to the state of an instruction cache and a data cache is stored in a trace storage device along with information corresponding to instructions fetched by the processor. When a cache load is necessary, updated cache information is stored in the trace storage device. Thereby, the state of the cache at all times during fetching of instructions may be known from the information stored in the trace storage device. Additionally, the particular instructions fetched is known from the fetched instructions information stored in the trace storage device. Hence the instruction stream may be reconstructed from the information stored in the trace storage device.

30 Claims, 6 Drawing Sheets

| ADDRESS (HEX) | INSTRUCTION | |
|---|---|---|
| 100 | load | |
| 104 | add | |
| 108 | add | |
| 10C | sub | |
| 110 | store | |
| 114 | add | |
| 118 | add | ← 610 |
| 11C | sub | |
| 120 | mult | |
| 124 | load | |
| 128 | shift | |
| 12C | addc | |
| 130 | rot | |
| 134 | store | |
| 138 | bc | 400 |
| 13C | b | 100 |
| | | |
| 400 | load | |
| 404 | bc | 1000    620 |
| 408 | b | 100 |

1 Cache Load: Address 100, data:
2 load,add,add,sub,store,add,add,sub,mult,load,shift,addc,rot,store,bc400, b100
3 Redirect: Address 100, executed 0 (first time in loop)
4 Redirect: Address 100, executed 15 (second time in loop, the conditional branch at 138 was not taken)
5 Cache Load: Address 400, data: load, bc 1000, b 100
6 Redirect: Address 400, executed 14 (conditional branch at 138 taken)
7 Redirect: Address 100, executed 2 (return to loop)
8 Redirect: Address 2000, executed 5 (Interrupt taken between 110 and 114, interrupt handler is at 2000)

| ADDRESS (HEX) | TAG | INSTRUCTION | |
|---|---|---|---|
| 100 | 0 | load | |
| 104 | 1 | add | |
| 108 | 2 | add | |
| 10C | 3 | sub | |
| 110 | 4 | store | |
| 114 | 5 | add | |
| 118 | 6 | add | |
| 11C | 7 | sub | |
| 120 | 8 | mult | |
| 124 | 9 | load | |
| 128 | 10 | shift | |
| 12C | 11 | addc | |
| 130 | 12 | rot | |
| 134 | 13 | store | |
| 138 | 14 | bc | 400 |
| 400 | 15 | load | (speculatively executed) |
| 404 | 0 | bc | 1000 |

---- wrong guess detected, flush back to tag 15

| 13C | 15 | b | 100 |
| 400 | 0 | load | |
| 404 | 1 | bc | 1000 |
| 408 | 2 | b | 100 |

Address 100, tag 0
Address 104, tag 1
   Tag 0, load address xyz
Address 108, tag 2
   Tag 0, complete
Address 10C, tag 3
Address 110, tag 4
Address 114, tag 5
Address 118, tag 6
Address 11C, tag 7
Address 120, tag 8
   Tag 1, complete
   Tag 2, complete
Address 124, tag 9
   Tag 3, complete
Address 128, tag 10
Address 12C, tag 11
   Tag 9, load address abc
   (note out of order execution)
   Tag 4, store address efg
Address 130, tag 12
   Tag 4, complete
   Tag 5, complete
Address 134, tag 13
   Tag 6, complete
   Tag 7, complete
Address 138, tag 14
   Tag 8, complete
Address 400, tag 15
   Tag 9, complete
Address 404, tag 0
Tag 10, complete
   Tag 15, load address mno
   (speculative load)
   Tag 13, store address pqr
   Tag 11, complete
   Tag 12, complete
   Tag 14, complete
   (at this point we realize the branch was mis-predicted)
Flush back to tag 14 (i.e. Remove Tag 0,15)
Address 13C, tag 15
Address 400, tag 0
Address 404, tag 1
Address 408, tag 2
   Tag 0, load address hij
Address 100, tag 3
   Tag 15, complete
   Tag 0, complete
   Tag 1, complete
   Tag 2, complete
   Tag 3, complete

METHOD SYSTEM AND APPARATUS FOR INSTRUCTION TRACING WITH OUT OF ORDER PROCESSORS

RELATED APPLICATIONS

This application is related to commonly assigned and co-pending U.S. patent application Ser. No. 09/552,856, filed Apr. 20, 2000, entitled "Method, System and Apparatus for Instruction Execution Tracing with Out of Order Processors," which is hereby incorporated by reference.

BACKGROUND OF THE INVENTION

1. Technical Field

The present invention is directed to a method, system and apparatus for instruction tracing with out of order speculative processors.

2. Description of Related Art

Instruction traces are used by software and hardware developers to capture the exact flow of instructions and addresses executed on a computer system. For maximum value, the instruction traces must contain all addresses for both instructions and data, address translation information to map the effective addresses to virtual and real addresses, the actual instruction image processed, and flow information to indicate the order instructions and data were processed. The resulting trace must be in the original order as coded by the programmer. Regardless of the order in which data is collected, the processor should run as close to full speed as possible while being traced. If the execution of instructions slows down considerably while the rest of the system (memory, input/output devices, other processors) continue to run at full speed, the resulting trace will not accurately portray the instruction stream at full speed. Input/output will seem to return much faster with fewer instructions between input/output request and return. Lock contention due to other processors will be distorted since the processor, under trace, cannot retry locks as quickly as the other processors.

Modern processors use out of order execution and speculative execution to increase performance. As a result, it is difficult to capture instruction and address flow in program order. Additionally, speculation results in the execution of instructions that may not be part of the actual program flow. To further complicate tracing, many modern processors transform the original instruction coded by the programmer into one or more internal instructions. Once the original instruction is transformed, it is lost.

Existing instruction trace methods, both hardware and software, disable the out of order nature of the processor by interrupting the processor after every instruction has completed. This mechanism has the undesirable effect of slowing down the processor and changing the execution behavior (by eliminating out of order execution and possibly reducing speculation). Slowing down the processor under trace distorts the instruction stream, possibly to the point where it is not representative of the actual execution stream.

Therefore, it would be advantageous to have a method and apparatus capable of performing instruction traces with out-of-order processors and speculative processors in which the nature of the operation of these processors is not altered during the trace.

SUMMARY OF THE INVENTION

The present invention is directed to a method, system and apparatus for instruction tracing with out of order speculative processors. With the present invention, information corresponding to the state of an instruction cache and a data cache is stored in a trace storage device for use in reconstructing an instruction stream of an out-of-order speculative processor. In addition, information corresponding to instructions fetched by the processor is stored in the trace storage device in sequential order as they are fetched.

When a cache load is necessary to obtain instructions that are not already stored in the instruction cache or data that is not already stored in the data cache, updated cache information is stored in the trace storage device. Thereby, the state of the cache at all times during fetching of instructions may be known from the information stored in the trace storage device. Additionally, the particular instructions fetched is known from the fetched instructions information stored in the trace storage device.

Thus, with the present invention the instruction stream of fetched instructions may be obtained from the information stored in the trace storage device. Thereby the instruction stream may be reconstructed for debugging purposes. Other features and advantages of the present invention will be described in, or will become apparent to those of ordinary skill in the art in view of, the following description of the preferred embodiments.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 6A is an exemplary diagram illustrating a program and a corresponding data structure in a trace storage device for recreating an instruction stream;

FIG. 6B is an exemplary diagram illustrating a program execution and a corresponding data structure in a trace storage device for recreating the program execution;

DETAILED DESCRIPTION OF THE PREFERRED EMBODIMENT

Figure 1:
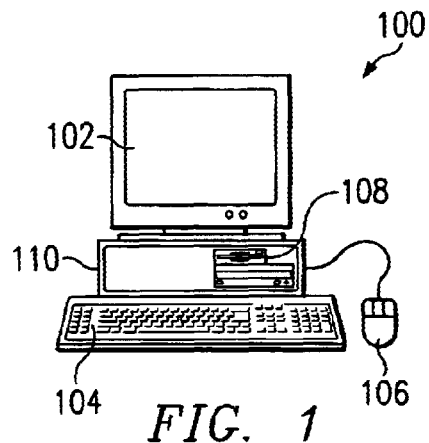
FIG. 1 is an exemplary diagram of a data processing apparatus in which the present invention may be implemented.

With reference now to FIG. 1, a pictorial representation depicts a data processing system in which the present invention may be implemented in accordance with a preferred embodiment of the present invention. A personal computer 100 is depicted which includes a system unit 110, a video display terminal 102, a keyboard 104, storage devices 108, which may include floppy drives and other types of permanent and removable storage media, and a pointing device 106, such as a mouse. Additional input devices may be included with personal computer 100, as will be readily apparent to those of ordinary skill in the art.

The personal computer 100 can be implemented using any suitable computer. Although the depicted representation shows a personal computer, other embodiments of the present invention may be implemented in other types of data processing systems, such as mainframes, workstations, network computers, Internet appliances, palm computers, etc.

The system unit 110 comprises memory, a central processing unit, one or more I/O units, and the like. However, in the present invention, the system unit 110 preferably contains a speculative processor, either as the central processing unit (CPU) or as one of multiple CPUs present in the system unit.

Figure 2:
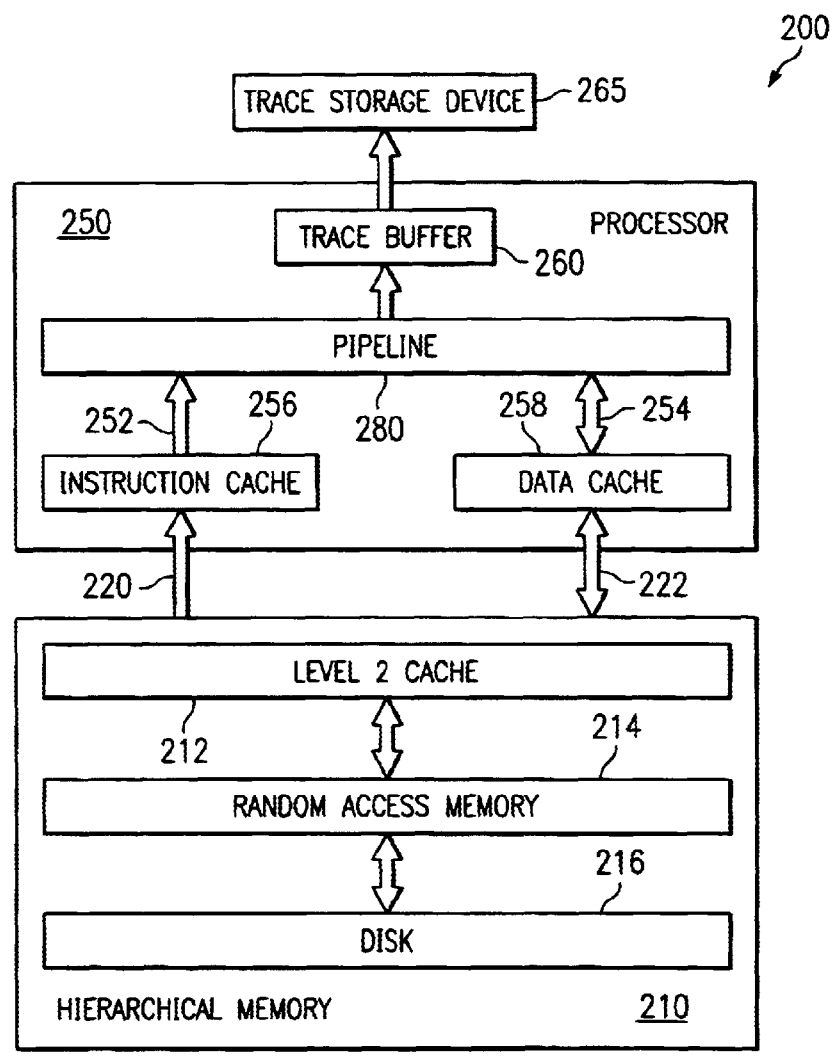
FIG. 2 is an exemplary block diagram of a processing system in which the present invention may be

With reference now to FIG. 2, a block diagram depicts selected internal functional units of a data processing system for processing information in accordance with a preferred embodiment of the present invention. The system 200 comprises a hierarchical memory 210 and processor 250. The hierarchical memory 210 comprises a Level 2 cache 212, a random access memory (RAM) 214, and a disk 216. The Level 2 cache 212 provides a fast access cache to data and instructions that may be stored in the RAM 214 in a manner which is well-known in the art. The RAM 214 provides main memory storage for data and instructions that may also provide a cache for data and instructions stored on the non-volatile disk 216.

Data and instructions may be transferred to the processor 250 from hierarchical memory 210 on instruction transfer path 220 and data transfer path 222. The instruction transfer path 220 and the data transfer path 222 may be implemented as a single bus or as separate buses between the processor 250 and the hierarchical memory 210. Alternatively, a single bus may transfer data and instructions between the processor 250 and the hierarchical memory 210 while the processor 250 provides separate instruction and data transfer paths within the processor 250, such as the instruction bus 252 and the data bus 254.

The processor 250 also comprises an instruction cache 256, a data cache 258, a trace buffer 260, and an instruction pipeline 280. The trace buffer 260 captures address and tag information corresponding to instructions and data sent via the pipeline 280 from the instruction cache 256 and the data cache 258. The address and tag information captured by the trace buffer 260 is then stored in the external trace storage device 265.

By "external" trace storage device, what is meant is that the trace storage device is external to the processor 250. However, the invention is not limited to such an implementation and a storage device that may be internal to the processor 250 may be used without departing from the spirit and scope of the present invention.

The processor 250 is a pipelined processor capable of executing multiple instructions in a single cycle, such as the PowerPC family of reduced instruction set computing (RISC) processors. During operation of the system 200, instructions and data are stored in the hierarchical memory 210. Instructions to be executed are transferred to the instruction pipeline 280 via the instruction cache 256. The instruction pipeline 256 decodes and executes the instructions that have been staged within the pipeline. Some instructions transfer data to or from the hierarchical memory 210 via the data cache 258. Other instructions may operate on data loaded from memory or may control the flow of instructions.

Figure 3:
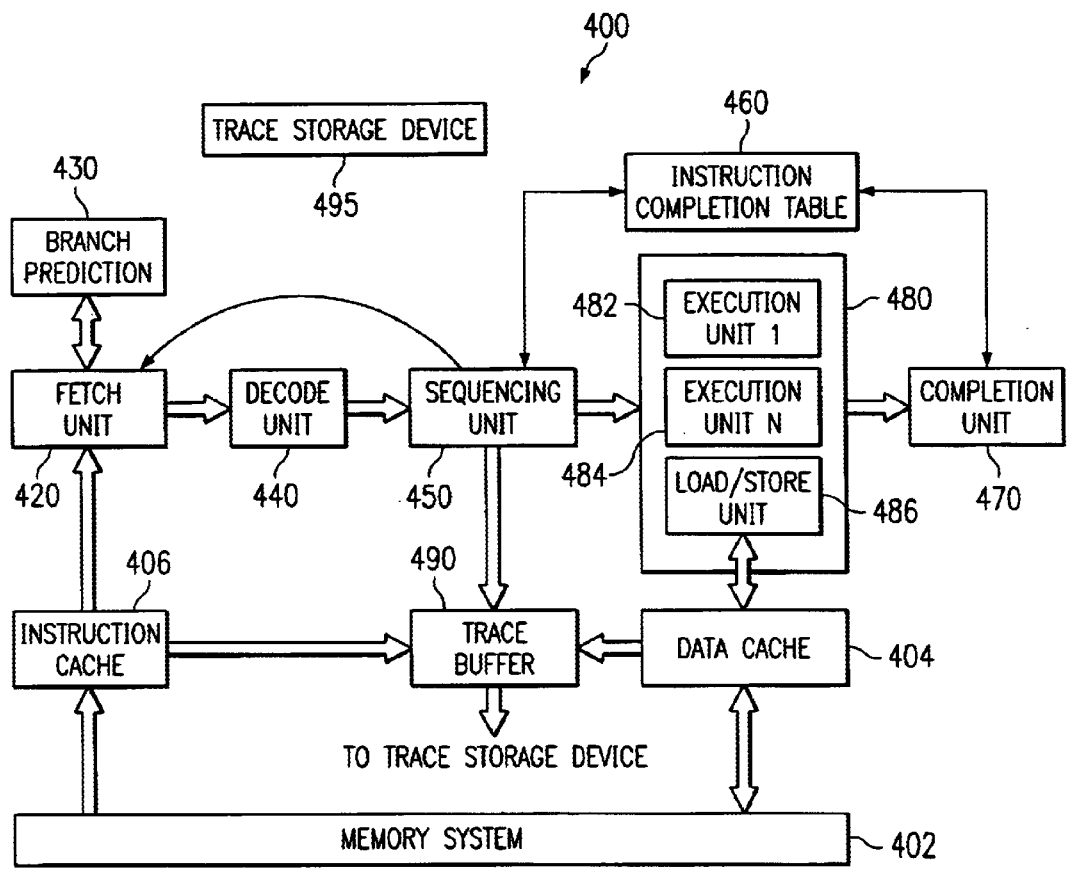
FIG. 3 is an exemplary block diagram of a processor according to the present invention.

With reference now to FIG. 3, a block diagram depicts further detail of the stages of an instruction pipeline within an out-of-order, speculative execution processor. The system 400 shows a memory system 402, a data cache 404, an instruction cache 406, a trace buffer 490, and a trace storage device 495, which may be similar to the hierarchical memory, data cache, instruction cache, and trace storage device shown in FIG. 2, respectively.

The fetch unit 420 retrieves instructions from instruction cache 406, which in turn retrieves instructions from memory 402. The decode unit 440 decodes instructions to determine basic information about the instruction, such as instruction type, source registers, and destination registers. The sequencing unit 450 uses the decoded information to schedule instructions for execution.

In order to track instructions, a completion table 460 is used for storing and retrieving information about scheduled instructions. As sequencing unit 450 assigns the dispatched instruction to an associated entry in completion table 460, sequencing unit 450 assigns or associates entries to executing instructions on a first-in, first-out basis or rotating manner. As the instructions are executed, information concerning the executing instructions is stored into various fields and subfields of the associated entry of completion table 460 for the particular instruction.

Instructions executed by execution control unit 480 using one of the execution units 1-N, such as execution unit #1 482 or execution unit #N 484, may use load/store unit 486 to cause data to be read from or written to memory 402 via data cache 404. As instructions complete, completion unit 410 commits the results of the execution of the instructions, and the destination registers of the instructions are made available for use by subsequent instructions. Any instructions may be issued to the appropriate execution unit as soon as its source registers are available.

Instructions are fetched and completed sequentially until a control (branch) instruction alters the instruction flow, either conditionally or unconditionally. A control instruction, i.e. an instruction stream event, specifies a new location from which to begin fetching instructions. When the fetch unit 420 receives a conditional branch operation and the data upon which the condition is based is not yet available (e.g., the instruction that will produce the necessary data has not been executed), the fetch unit 420 may use one or more branch prediction mechanisms in the branch prediction control unit 430 to predict the outcome of the condition. Control is then speculatively altered until the results of the condition can be determined. If the branch was correctly predicted, operation continues. If the prediction was incorrect, all instructions along the speculative path are canceled or flushed.

Since speculative instructions can not complete until the branch condition is resolved, many high performance out-of-order processors provide a mechanism to map physical registers to virtual registers. The result of execution is written to the virtual register when the instruction has finished executing. Physical registers are not updated until an instruction actually completes. Any instructions dependent upon the results of a previous instruction may begin execution as soon as the virtual register is written. In this way, a long stream of speculative instructions can be executed before determining the outcome of the conditional branch.

As instructions and data are loaded into the respective caches 406 and 404, address and content information for the instructions and data are captured by the trace buffer 490, which then sends this address and content information to the trace storage device 495. The trace storage device 495 stores the address and content information in data structures which can be used to construct a "snap shot" of the caches 404 and 406. These "snap shots" are stored in the trace storage device 495 in response to the occurrence of a cache state change event, such as a cache load. Thus, for every cache state change event, address information for the instructions and data stored in the instruction cache 406 and data cache 404 are stored in a data structure of trace storage device 495.

The trace storage device 495 need not maintain the data structures and "snap shots" in real time but may do so based on discrete events. For example, the trace storage device 495 might only store the cache state change information which could later be used by the present invention to reconstruct the events and the resulting cache states.

For purposes of clarity in the following description of the invention, only processing of instructions from the instruction cache 406 will be described. However, as will be apparent to those of ordinary skill in the art, the principles of this invention are equally applicable to data that is processed from the data cache 404.

As instructions are fetched by the fetch unit 420, the address information for the instruction fetched is sent to the trace buffer 490 and ultimately to the trace storage device 495. The trace storage device 495 stores information that is written to it in sequential order. In this way, a real time sequential listing of all instructions fetched by the fetch unit 420 may be obtained. This sequential listing may be used to reconstruct the instruction stream of an executed program, i.e. the particular instruction sequence or code created by the programmer of the program.

As is apparent to those of ordinary skill in the art, the instruction stream is not necessarily the same as the execution stream. The execution stream may differ from the instruction stream in that instructions fetched by the fetch unit 420 may not be executed or may be executed in a different order than the order in which they are fetched. Such differences may be the result of out-of-order processing, speculative processing, execution errors, and the like.

By storing the address information for instructions fetched, sequentially in the trace storage device 495, a reconstruction device may be utilized to reconstruct the instruction stream of the program fetched by the fetch unit 420. For example, as will be discussed in more detail hereafter, the cache information stored in the trace storage device 495 may be utilized in addition to the address information for fetched instructions, to implement one or more cache models in a reconstruction device. The cache models may be utilized to determine which instructions in the cache were fetched by the fetch unit 420 and in what order the instructions were fetched. In this way, the instruction stream for a program may be recreated.

As a further feature of the present invention, the cache information and address information of fetched instructions may be utilized along with instruction execution information to recreate the execution stream of an executed program. This further feature will be described in detail hereafter.

In addition, to the address information for fetched instructions, the fetch unit 420 maintains a count of the number of instructions fetched between instruction stream events. Instruction stream events are happenings that cause the instruction stream to be altered from a sequential instruction order. An instruction stream event may be, for example, a redirect of a program sequence to another portion of a program or an interrupt from an internal or external condition. Such redirects or interrupts may be the result of conditional or unconditional branch operations, as described above.

Figure 4:
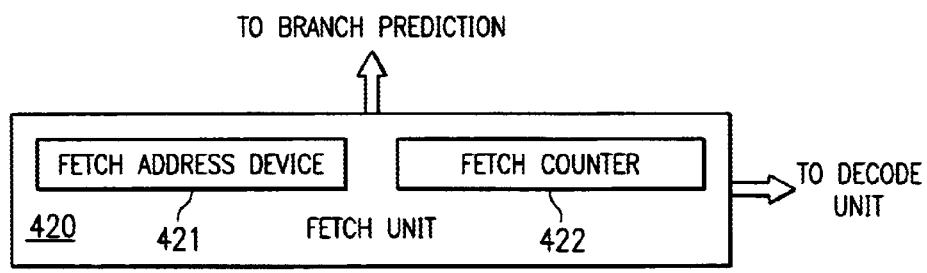
FIG. 4 is an exemplary block diagram of a fetch unit in accordance with the present invention.

FIG. 4 is an exemplary block diagram of a fetch unit, such as fetch unit 420. As shown in FIG. 4, the fetch unit 420 includes a fetch address device 421 and a fetch counter 422. The fetch address device 421 fetches instructions from address locations in the instruction cache. The fetch counter 422 maintains a count of the number of instructions fetched between instruction stream events, such as a redirect. The count is output to the trace buffer 490 and is reinitialized with the occurrence of each instruction stream event.

Although FIG. 4 shows the fetch unit 420 having a fetch counter 422 for maintaining a count of the number of instructions fetched, the invention is not limited to such a configuration. Rather, the instruction count may be maintained by a counter located anywhere within the system 400, without departing from the spirit and scope of the invention. For example, the counter may be a separate device or may be incorporated, for example, into completion unit 70.

Alternatively, the counter may be incorporated into the sequencing unit 450, such as when instructions are grouped into a single entry in the completion table. As a new group is formed the trace record in the trace storage device 495 would include the starting address, the tag, and the number of instructions in the group. Then using the instruction stream reconstruction method and apparatus of this invention, this information may be used to determine the actual instructions executed.

As instructions are sequenced by the sequencing unit 450 and entries are created in the instruction completion table 460, a unique identifier is associated with the instruction is created and sent to the trace buffer 490 via the sequence unit 450 and ultimately stored in the trace storage device 495 along with the instruction address.

The unique identifier is used as a means by which to track the instruction as it is sequenced and ultimately executed by an execution unit. The unique identifier, in a preferred embodiment, is the index into the completion table 460 for the particular instruction.

The unique identifier is used because, for example, in the case of a dynamic program, instruction address information may be irretrievable after the instruction has been executed. As the state of the completion table 460 changes, i.e. instructions are sequenced and executed, the unique identifiers of the instructions sequenced and executed are stored in the trace storage device 495 via the trace buffer 490 in sequential order. Thus, the trace storage device 495 stores a sequential list of instructions that are sequenced and executed by the processor.

By correlating this unique identifier information with the cache information and the address information of fetched instructions, the execution stream of a program may be reconstructed. Thus, a reconstruction device may use the information stored in the trace storage device 495, not only to reconstruct the instruction stream of a program, but also to reconstruct the execution stream of the program. Such reconstruction may be performed even if the processor is an out-of-order, speculative processor since information of fetched, sequenced and executed instructions are stored sequentially.

As described above, the instruction stream can be reconstructed by using the instruction address to determine what was in the instruction cache at a particular point in time. In addition, the execution stream can be reconstructed by tracing every instruction address (which will be done when a unique tag is used for each instruction), group of instructions (as when a single completion table slot is used to track more than one instruction), or when the instruction stream is no longer sequential. For groups of instructions or non-sequential instructions, the number of instructions since the last reconstruction is utilized to determine the instructions executed.

Figures 5, 7:
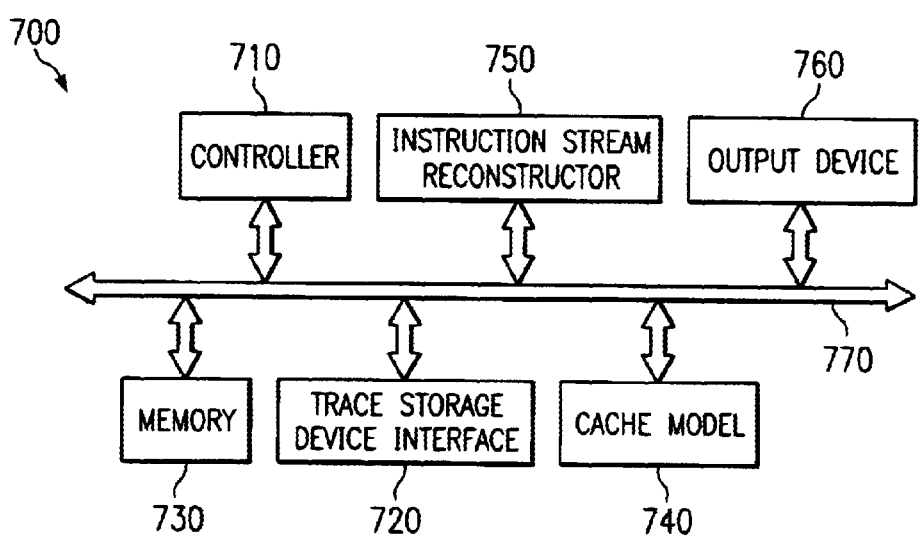
FIG. 5 is an exemplary diagram of an instruction completion table according to the present invention.
FIG. 7 is an exemplary block diagram of an instruction stream reconstruction device according to the present invention.

With reference now to FIG. 5, a diagram illustrates an instruction completion table that may be used in a speculative processor. Completion table 500 is organized as a circular list with each entry in completion table 500 tracking a single instruction. An instruction is said to have a "tag value" equal to its index value into completion table 500. The tag value associated with an instruction may be used to identify the instruction and events caused by the execution of the instruction. The "tag value" may be used as the unique identifier that is stored in the trace storage device 495, as discussed above.

Allocation tag 502 holds the index of the next available entry. Completion tag 504 holds the index of a completing instruction. If no completion table entries are available, the sequencing unit of the processor stalls until an entry is available.

FIG. 5 shows exemplary data within completion table 500 in which the completion tag points to entry 3 and the allocation tag points to entry 6. The instruction in entry 3 is next to complete. Instructions in entries 4–5 can be waiting to execute, currently executing, or waiting to complete. The next instruction that is decoded will be placed into entry 6 and the allocation pointer will increment to point to entry 7. If the allocation pointer points to entry 15, then it will wrap to zero instead of incrementing to non-existent entry 16, i.e. the pointers wrap in a circular fashion. In this example, if the allocation pointer pointed to entry 2, no more entries would be available.

Alternatively, a single completion table entry may be allocated for a group of instructions. All of the instructions within the group would then be tracked with a single tag value.

With the present invention, the tag value for the instructions in the instruction completion table 460, is used to trace the execution of a program and to reconstruct the instruction stream of the program. The trace storage device 495 stores address information for the instructions as the are loaded into the instruction cache 406. When the instructions are sequenced by the sequencing unit 450, an entry in the instruction completion table 460 is created with a tag value that is then stored in the trace storage device 495 in association with the address information previously stored for the instruction. When the state of the instruction changes, such as when the instruction is executed by an execution unit 482 or when the instruction is flushed, the instruction state is updated in the instruction completion table 460 and information identifying the executed instruction is stored in the trace storage device 495. In this way, the trace storage device 495 stores sufficient information such that the instruction execution stream may be reconstructed after execution of a program.

FIG. 6A is an exemplary diagram illustrating a program and corresponding data structures of a trace storage device, such as trace storage device 495, for reconstructing an instruction stream. As shown in FIG. 6A, the program 610 is comprised of a plurality of instructions (greatly simplified in the present example) with associated instruction addresses (provided in hexadecimal format).

The data structure 620 illustrates the information corresponding to the program 610 which is stored in the trace storage device. As shown in FIG. 6A, the first portion of the data structure 620 represents a loading of the instruction cache with instructions from the program 610. As the instructions are fetched, sequenced, and executed, the fetch unit maintains a count of the number of instructions fetched. When an instruction stream event occurs, such as a redirect, information is stored in the data structure pertaining to the redirect event. The information includes, for example, the address of the instruction to which the program is redirected and the number of instructions executed since the last redirect. Other information may also be stored, such as the address or unique identifier of the branch instruction from which the redirect occurred, and the like.

As cache state changes occur and instruction stream events occur, information is updated and stored in the data structure 620 to reflect these occurrences. In this way, sufficient information may be stored for later reconstruction of the instruction stream.

FIG. 6B is an exemplary diagram illustrating a data structure for reconstructing an execution stream of the computer program 630. As shown in FIG. 6B, the data structure 640 contains information stored to reconstruct the execution stream includes the address of the instruction and the unique identifier (tag) of the instruction sequenced, such as "Address 100, tag 0." In addition, as instructions are executed and completed, the data structure maintains information regarding the execution and completion of these sequenced instructions. For example, "tag 1, complete" means that the instruction associated with the unique identifier "tag 1" has completed execution. The entry "tag 9, load address abc" indicates that the instruction associated with tag 9 has been executed by the processor but has not yet been completed. This may be due to out of order and/or speculative execution. The instruction associated with tag 9 is completed once all required prior instructions have been executed and completed and an entry "tag 9, complete" is stored in the data structure.

FIG. 7 is an exemplary block diagram illustrating an instruction stream reconstruction device 700 according to the present invention. As shown in FIG. 7, the instruction stream reconstruction device 700 includes a controller 710, a trace storage device interface 720, a memory 730, a cache model 740, an instruction stream reconstructor 750, and an output device 760. These devices are in communication with one another over control/signal bus 770. Although a bus architecture is shown in FIG. 7, other architectures that facilitate communication between these devices may be used without departing from the spirit and scope of the present invention.

The controller 710 controls the operation of the instruction stream reconstruction device 700. When an instruction stream is to be reconstructed, the controller 710 retrieves trace information from the trace storage device via the trace storage device interface 720. Information pertaining to cache loads and cache states are stored in the cache model 740, which models the state of the cache at various points in the instruction stream. Information pertaining to instruction stream events are stored in the memory 730.

The instruction stream reconstructor 750 utilizes the cache model 740 and the instruction stream event information in the memory 730 to reconstruct the instruction stream. The results of the reconstruction may then be output by the output device 760.

For example, using the information in data structure 620 in FIG. 6, lines 1–2 of the data structure are loaded into the cache model 740. Thereafter, lines 3 and 4 are stored in memory 730. The instruction stream reconstructor 750 may then deduce, based on the redirect information of line 3, that the program execution was initiated, i.e. 0 instructions have been executed. From line 4, the instruction stream reconstructor 750 deduces that the 15 instructions prior to the branch conditional at address 13C were executed and that the program was redirected back to address 100. In other words, the branch condition at address 138 was not taken.

Next, a cache load occurs and the information at line 5 is stored in the cache model 740. Then, the instruction stream reconstructor 750, determines from line 6 that 14 instructions in the cache model 750 were executed prior to reaching the branch conditional at address 138 and that a redirect to address 400 occurred. Thereafter, from line 7, 2 instructions were executed just prior to a redirect to address 100. Finally, from line 8, 5 instructions were executed prior to a recited to address 2000, i.e. an interrupt was taken between 110 and 114 and the interrupt handler is at address 2000.

Thus, with the information stored in the trace storage device, the instruction stream reconstruction device 700, may reconstruct an instruction stream even when the instructions are being executed by out of order speculative processors.

Figure 8:
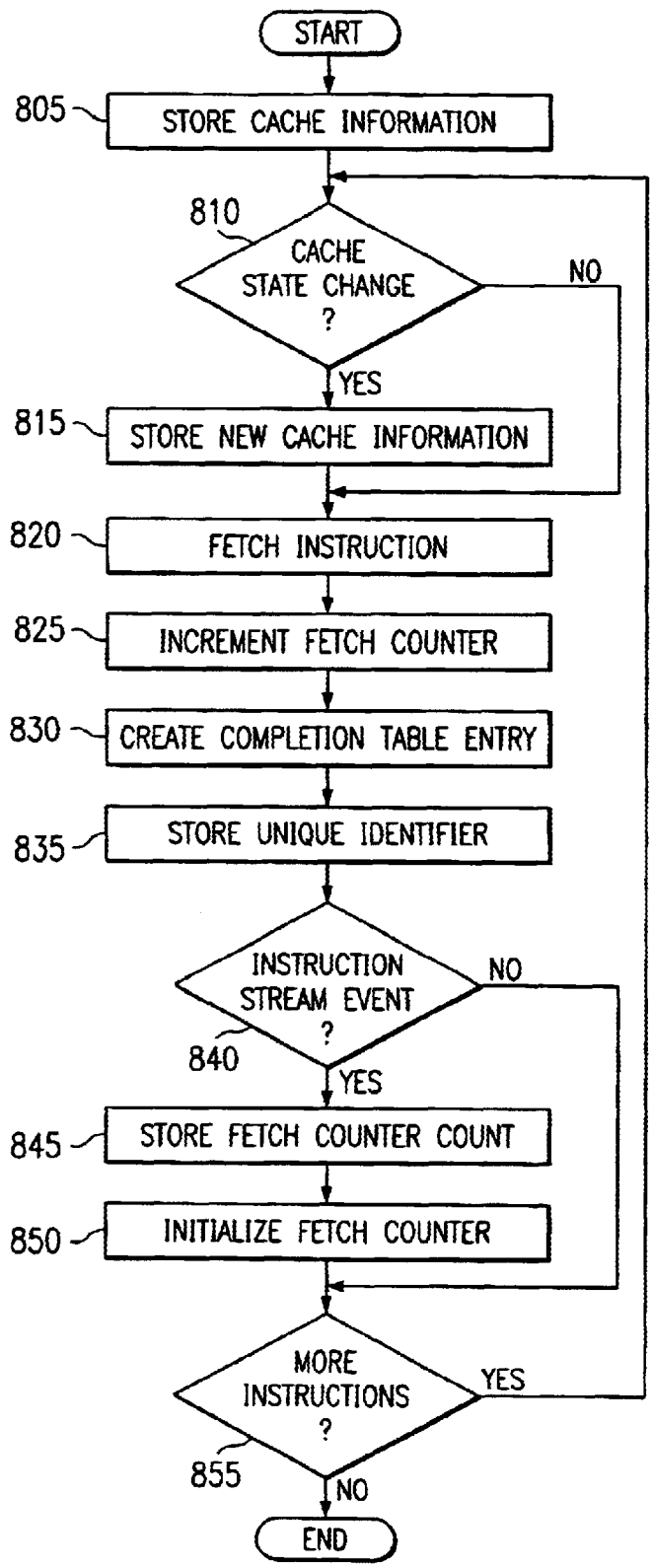
FIG. 8 is a flowchart outlining an exemplary operation of the present invention when storing trace information in a trace storage device.

FIG. 8 is a flowchart outlining an exemplary operation for storing information for use in reconstruction an instruction stream. As shown in FIG. 8, the operation starts with storing cache information for the current state of the cache in the trace storage device (step 805). Then, it is determined whether a cache state change occurs, such as a cache load (step 810). If so, the new cache information for the cache state change is stored in the trace storage device (step 815).

Next, an instruction is fetched from the instruction cache (step 820), the fetch counter is incremented (step 825) and an entry in the completion table is created (step 830). The unique identifier associated with the instruction, e.g. the index into the completion table, is stored in association with address information for the instructions (step 835). It is then determined whether an instruction stream event has occurred, e.g. a redirect (step 840). If so, the fetch counter count is stored in the trace storage device (step 845) and the fetch counter is then initialized (step 850). Thereafter, if there are more instructions to be fetched (Step 855:YES), operation returns to step 810. Otherwise the operation ends.

With the present invention, information pertaining to the execution of an instruction stream is stored in a storage device for later use in reconstructing the instruction stream. The information stored includes information corresponding to the cache states as the instruction stream is executed and the instruction stream events that occur during execution. In addition, unique identifiers of the instructions are stored for later identifying the particular instructions executed. In this way, an instruction stream may be reconstructed even when implemented with out of order speculative processors.

It is important to note, that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for use with an out-of-order, speculative processor for reconstructing an instruction stream and an execution stream of program instructions, wherein the out-of-order, speculative operation of the processor is unaltered during a trace, comprising:

storing, in a storage device, cache information corresponding to instructions loaded in an instruction cache;

fetching instructions from the instruction cache;

storing, in the storage device, fetched instructions information corresponding to instructions fetched from the instruction cache;

reconstructing the instruction stream based on the cache information and the fetched instructions information;

tagging each one of said instructions using a unique identifier;

tracking said instructions utilizing said unique identifiers as said instructions are executed; and reconstructing said execution stream utilizing said unique identifiers.

2. The method of claim 1, wherein the fetched instructions information is stored sequentially as the instructions are fetched.

3. The method of claim 1, further comprising storing updated cache information corresponding to instructions stored in the instruction cache when a cache load operation is performed.

4. The method of claim 3, wherein the cache information and the updated cache information are stored sequentially along with the fetched instructions information in the storage device.

5. The method of claim 1, wherein fetching instructions includes speculatively fetching instructions corresponding to a branch instruction.

6. The method of claim 1, further comprising counting the number of instructions fetched between branch instructions.

7. The method of claim 1, wherein the storage device is external to the processor.

8. The method of claim 1, wherein the storage device is internal to the processor.

9. The method of claim 1, further comprising:

storing, in the storage device, data cache information corresponding to data loaded in a data cache;

fetching data from the data cache; and storing, in the storage device, fetched data information corresponding to data fetched from the data cache, wherein the instruction stream is reconstructed based on the data cache information and the fetched data information.

10. An apparatus, for use with an out-of-order, speculative processor having an instruction cache, for reconstructing an instruction stream and an execution stream of program instructions, wherein the out-of-order, speculative operation of the processor is unaltered during a trace, comprising:

a storage device that stores cache information corresponding to instructions loaded in the instruction cache and fetched instructions information corresponding to instructions fetched from the instruction cache;

an instruction stream reconstruction device that reconstructs the instruction stream based on the cache information and the fetched instructions information;

a different unique identifier assigned to each one of said instructions;

said unique identifying for tracking said instructions as said instructions are executed; and an execution stream reconstruction device that reconstructs the execution stream of said instructions utilizing said unique identifiers.

11. The apparatus of claim 10, wherein the fetched instructions information is stored sequentially as the instructions are fetched.

12. The apparatus of claim 10, wherein the storage device stores updated cache information corresponding to instructions stored in the instruction cache when a cache load operation is performed.

13. The apparatus of claim 12, wherein the cache information and the updated cache information are stored sequentially along with the fetched instructions information in the storage device.

14. The apparatus of claim 10, wherein the instructions are speculatively fetched instructions corresponding to a branch instruction.

15. The apparatus of claim 10, wherein the storage device stores a count of the number of instructions fetched between branch instructions.

16. The apparatus of claim 10, wherein the storage device is external to the processor.

17. The apparatus of claim 10, wherein the storage device is internal to the processor.

18. The apparatus of claim 10, wherein the storage device stores data cache information corresponding to data loaded in a data cache and fetched data information corresponding to data fetched from the data cache, and wherein the instruction stream reconstruction device reconstructs the instruction stream based on the data cache information and the fetched data information.

19. A computer program product in a computer readable medium for use with a processor for reconstructing an instruction stream and an execution stream of program instructions, comprising:

instructions for storing, in a storage device, cache information corresponding to instructions loaded in an instruction cache;

instructions for fetching instructions from the instruction cache;

instructions for storing, in the storage device, fetched instructions information corresponding to instructions fetched from the instruction cache;

instructions for reconstructing the instruction stream based on the cache information and the fetched instructions information;

instructions for tagging each one of said instructions using a different unique identifier;

instructions for tracking said instructions utilizing said unique identifiers as said instructions are executed; and instructions for reconstructing the execution stream utilizing said unique identifiers.

20. The computer program product of claim 19, wherein the fetched instructions information is stored sequentially as the instructions are fetched.

21. The computer program product of claim 19, further comprising instructions for storing updated cache information corresponding to instructions stored in the instruction cache when a cache load operation is performed.

22. The computer program product of claim 21, wherein the cache information and the updated cache information are stored sequentially along with the fetched instructions information in the storage device.

23. The computer program product of claim 19, wherein fetching instructions includes speculatively fetching instructions corresponding to a branch instruction.

24. The computer program product of claim 19, further comprising instructions for counting the number of instructions fetched between branch instructions.

25. The computer program product of claim 19, further comprising:

instructions for storing, in the storage device, data cache information corresponding to data loaded in a data cache;

instructions for fetching data from the data cache; and instructions for storing, in the storage device, fetched data information corresponding to data fetched from the data cache, wherein the instruction stream is reconstructed based on the data cache information and the fetched data information.

26. An system for reconstructing an instruction stream and an execution stream of program instructions, comprising:

an out-of-order, speculative processor;

an instruction cache, coupled to the processor, for storing instructions;

a fetch unit for fetching instructions from the instruction cache;

a storage device that stores cache information corresponding to instructions loaded in the instruction cache and fetched instructions information corresponding to instructions fetched from the instruction cache;

an instruction stream reconstruction device that reconstructs the instruction stream based on the cache information and the fetched instructions information;

a unique identifier assigned to each one of said instructions;

said unique identifier being used to track said instructions as said instructions are executed; and an execution stream reconstruction device that reconstructs the execution stream utilizing said unique identifiers.

27. The system of claim 26, wherein the storage device stores updated cache information corresponding to instructions stored in the instruction cache when a cache load operation is performed.

28. The system of claim 26, wherein the storage device is external to the processor.

29. The system of claim 26, wherein the storage device is internal to the processor.

30. The system of claim 26, further comprising a data cache coupled to the processor, wherein the storage device stores data cache information corresponding to data loaded in the data cache and fetched data information corresponding to data fetched from the data cache, and wherein the instruction stream reconstruction device reconstructs the instruction stream based on the data cache information and the fetched data information.

* * * * *